(12) United States Patent
Wang

(10) Patent No.: US 12,191,047 B2
(45) Date of Patent: Jan. 7, 2025

(54) COPPER-ALUMINUM COMPOSITE ELECTRIC ENERGY TRANSMISSION SYSTEM AND PROCESSING METHOD THEREFOR

(71) Applicant: JILIN ZHONG YING HIGH TECHNOLOGY CO., LTD., Changchun (CN)

(72) Inventor: Chao Wang, Changchun (CN)

(73) Assignee: JILIN ZHONG YING HIGH TECHNOLOGY CO., LTD., Changchun (CN)

( * ) Notice: Subject to any disclaimer, the term of this patent is extended or adjusted under 35 U.S.C. 154(b) by 148 days.

(21) Appl. No.: 17/915,672

(22) PCT Filed: Apr. 1, 2021

(86) PCT No.: PCT/CN2021/084920
§ 371 (c)(1),
(2) Date: Sep. 29, 2022

(87) PCT Pub. No.: WO2021/197423
PCT Pub. Date: Oct. 7, 2021

(65) Prior Publication Data
US 2023/0112646 A1 Apr. 13, 2023

(30) Foreign Application Priority Data
Apr. 1, 2020 (CN) .......................... 202010250067.6

(51) Int. Cl.
*H01R 4/20* (2006.01)
*H01B 1/02* (2006.01)
(Continued)

(52) U.S. Cl.
CPC ............... *H01B 1/023* (2013.01); *H01B 7/02* (2013.01); *H01B 9/02* (2013.01); *H01B 13/0036* (2013.01)

(58) Field of Classification Search
CPC ........ H01B 1/023; H01B 7/0009; H01B 7/02; H01B 7/04; H01B 7/06; H01B 9/02;
(Continued)

(56) References Cited

U.S. PATENT DOCUMENTS 2,868,863 A * 1/1959 Cook ....................... H01R 4/62
403/267
3,656,092 A * 4/1972 Swengel, Sr. .......... H01R 4/723
439/730
(Continued)

FOREIGN PATENT DOCUMENTS

CN 201862928 U 6/2011
CN 103354308 A 10/2013
(Continued)

OTHER PUBLICATIONS

International Search Report from corresponding International Application No. PCT/CN2021/084920, mailed May 27, 2021, 6 pages with translation.
(Continued)

*Primary Examiner* — William H. Mayo, III
(74) *Attorney, Agent, or Firm* — Tucker Ellis LLP

(57) ABSTRACT

A copper-aluminum composite electric energy transmission system and a processing method therefor. The system includes a copper terminal and an aluminum cable. The aluminum cable includes an aluminum conductor and an insulation layer cladding a periphery of the aluminum conductor. The system further includes an electric energy transmission aluminum piece, in which a section of the aluminum conductor with the insulation layer stripped from the alu-
(Continued)

minum cable is pressed to form a connecting piece. The electric energy transmission aluminum piece and a front end of the aluminum conductor form a molten layer. An end of the copper terminal for being welded to the electric energy transmission aluminum piece is provided with a welding platform. The molten layer clads the welding platform to form a transition layer with metal atoms penetrating into or combined with each other.

19 Claims, 4 Drawing Sheets

(51) Int. Cl.
    *H01B 7/02*              (2006.01)
    *H01B 9/02*              (2006.01)
    *H01B 13/00*            (2006.01)

(58) Field of Classification Search
    CPC ........ H01B 13/0036; H01R 4/02; H01R 4/20; H01R 4/187; H01R 4/203; H01R 4/62; H01R 4/625; H01R 11/11; H01R 11/12; H01R 43/02; H01R 43/0207
    USPC ...... 174/74 R, 84 R, 84 C, 85, 94 R; 439/98, 439/877, 882, 874
    See application file for complete search history.

(56) References Cited

U.S. PATENT DOCUMENTS

| | | | | | |
|---|---|---|---|---|---|
| 3,895,851 | A | * | 7/1975 | Bolton | ............... H01R 4/62 439/387 |
| 6,538,203 | B1 | * | 3/2003 | Nolle | ............... H01R 11/283 174/84 C |
| 10,164,348 | B2 | * | 12/2018 | Peters | ............... H01B 7/0009 |
| 2004/0053542 | A1 | * | 3/2004 | Gloaguen | ............... H01R 4/62 439/877 |
| 2014/0262501 | A1 | * | 9/2014 | Stol | ............... H01R 4/625 29/869 |
| 2016/0099510 | A1 | * | 4/2016 | Trafton | ............... H01B 13/0036 29/17.3 |
| 2019/0260145 | A1 | * | 8/2019 | Wang | ............... H01R 11/12 |
| 2020/0144738 | A1 | * | 5/2020 | Wang | ............... H01R 43/0207 |
| 2020/0161820 | A1 | * | 5/2020 | Wang | ............... B23K 10/022 |

FOREIGN PATENT DOCUMENTS

| | | | | |
|---|---|---|---|---|
| CN | 203312469 | U | 11/2013 | |
| CN | 106207499 | A | 12/2016 | |
| CN | 109494498 | A | 3/2019 | |
| CN | 110832713 | A | 2/2020 | |
| CN | 111462946 | A | 7/2020 | |
| CN | 211980234 | U | 11/2020 | |
| KR | 20180074201 | A | 7/2018 | |
| WO | WO 2012/143154 | A1 * | 10/2012 | ............... H01R 4/02 |
| WO | 2021197423 | A1 | 10/2021 | |

OTHER PUBLICATIONS

Extended European Search Report from corresponding European Application No. 21780071.3, mailed Sep. 15, 2023, 22 pages.
Office Action from corresponding Vietnam Application No. 1-2022-06855 mailed on Apr. 24, 2024, 4 pages.
Office Action from corresponding European Application No. 21780071.3 mailed on Jun. 21, 2024, 7 pages.
Office Action from corresponding Korean Application No. 10-2022-7038123 mailed on May 9, 2024, 10 pages.

* cited by examiner

COPPER-ALUMINUM COMPOSITE ELECTRIC ENERGY TRANSMISSION SYSTEM AND PROCESSING METHOD THEREFOR

CROSS-REFERENCE OF THE RELATED APPLICATION

The present disclosure claims priority to Chinese Patent Application No. 202010250067.6, entitled "copper-aluminum composite electric energy transmission system and processing method therefor".

TECHNICAL FIELD

The present disclosure relates to a technical field of conductive metal connectors, and particularly to a copper-aluminum composite electric energy transmission system and a processing method therefor.

BACKGROUND

Copper and copper alloy is widely used in the field of electrical connections because of its good electrical conductivity, thermal conductivity and plasticity. However, there is a shortage of copper resources, and the content of copper in the earth's crust is only about 0.01%. With the increase of the usage time, the cost of copper will rise year by year. Therefore, people begin to look for alternatives to metal copper to reduce the cost.

The content of metal aluminum in the earth's crust is about 7.73%. With the refining technology of aluminum being optimized, the price of aluminum is relatively low. Aluminum also has excellent electrical conductivity, thermal conductivity and plastic workability. Therefore, it is a main development trend at present to replace copper with aluminum in the field of automobile electrical connections.

Compared with copper, aluminum has slightly low hardness, plasticity and corrosion resistance, but its weight is lighter, and its conductivity ranks only second to that of copper. Thus, aluminum can partially replace copper in the field of electrical connections. However, due to a large electrode potential difference between copper and aluminum, an electrochemical corrosion will occur between the directly connected copper and aluminum, such that aluminum is susceptible to the corrosion and a resistance in the connection area may increase, which will easily lead to serious consequences such as functional failures and fires in the electrical connections.

The previous method of connecting copper and aluminum are generally molten welding, cold welding, electron beam welding, explosion welding, etc. However, the j oints welded in these welding methods are brittle, and porosities and cracks are easy to occur in the welding seams. Especially in the welding seams treated at a high temperature, the grains become coarse, which seriously affects the mechanical and electrical properties of the bonding surface of the welding base material, and it is impossible to meet the requirements in the field of automotive electrical connections.

The current method of connecting copper and aluminum are generally friction welding, ultrasonic welding, resistance welding, etc. In order to increase the stability of the copper-aluminum contact surface of the copper-aluminum composite transmission system, the prior art increases the area of the copper-aluminum initial contact surface to obtain a more stable system. The friction welding generates energy through a relative rotation friction between copper and aluminum weldments. The ultrasonic welding generates energy through a relative displacement friction between the copper and aluminum weldments. The resistance welding is to introduce electric current between the copper and aluminum weldments, generate energy through a contact resistance, and then apply a pressure to weld the copper and aluminum weldments together. Meanwhile, it should be noted that for the friction welding and the ultrasonic welding, the relatively smooth plane of the contact surface of the copper and aluminum weldments will reduce the friction coefficient and then the welding energy generated. For the resistance welding, the flatter the contact surface of the weldments, the smaller the contact resistance, and the less welding energy is generated. The reduction of the energy absorbed by the welding will reduce the welding quality between copper and aluminum, which may lead to batch accidents. In order to ensure that the welding contact area absorbs enough energy, it is necessary to increase the output of welding energy, resulting in increased costs.

In addition, in the friction welding, the copper and aluminum weldments are subjected to a relative rotation friction. However, the center points of the copper and aluminum weldments have no relative linear speed, and the linear speed of the relative rotation of the copper and aluminum weldments increases in the direction toward the periphery of the copper and aluminum weldments. Thus, the frictions at the center and the periphery of the copper and aluminum weldments generate different energy, which will lead to excessive welding of the periphery of the copper and aluminum weldments while the welding at the center is still not completed. Meanwhile, a large amount of internal stress is also generated in the welding seam, and even if the properties of the welding joint are qualified when the welding is completed, brittle fracture at the welding joint will still occur after a long-term use, which will lead to major accidents in severe cases.

Therefore, in the technical field of conductive metal connecting pieces, there is an urgent need for a copper-aluminum composite electric energy transmission system with a simple structure, a more stable welding process, better mechanical and electrical properties, and a longer service life.

SUMMARY

In order to overcome the disadvantages of the prior art, an objective of the present disclosure is to provide a copper-aluminum composite electric energy transmission system, which reduces an copper-aluminum initial contact area and increases an initial friction coefficient of a copper-aluminum contact surface, thereby reducing energy required for manufacturing the copper-aluminum composite electric energy transmission system, improving mechanical and electrical properties of the copper-aluminum composite electric energy transmission system, and reducing the use cost of the copper-aluminum composite electric energy transmission system. Meanwhile, by extending a path of a transition layer to resist an erosion from an external environment to the copper-aluminum composite electric energy transmission system, a corrosion problem of the copper-aluminum composite electric energy transmission system is solved, and a service life of the copper-aluminum composite electric energy transmission system is prolonged.

In order to achieve the above objective, the present disclosure adopts the following technical solutions.

The present disclosure discloses a copper-aluminum composite electric energy transmission system including a copper terminal and an aluminum cable. The aluminum cable includes an aluminum conductor and an insulation layer cladding a periphery of the aluminum conductor. The system further includes an electric energy transmission aluminum piece. A section of the aluminum conductor with the insulation layer stripped from the aluminum cable is wrapped by the electric energy transmission aluminum piece to form a connecting piece. An end of the copper terminal for being welded to the connecting piece is provided with a welding platform. A transition layer with metal atoms penetrating into or combined with each other is formed between the welding platform and the connecting piece.

The present disclosure further discloses a processing method of a copper-aluminum composite electric energy transmission system, including:

a pre-assembling step: inserting a section of an aluminum conductor with an insulation layer stripped from an aluminum cable into an electric energy transmission aluminum piece, and pressing the section of the aluminum conductor into the electric energy transmission aluminum piece using a pressing device to form a connecting piece wrapped by the electric energy transmission aluminum piece; and a welding step: welding a copper terminal with a welding platform to the connecting piece, to form a transition layer with metal atoms penetrating into or combined with each other, between the welding platform and the connecting piece.

Compared with the prior art, the present disclosure has the following advantageous effects.

1. The copper-aluminum composite electric energy transmission system of the present disclosure is different from the existing research results. In the prior art, the mechanical and electrical properties of the copper-aluminum composite electric energy transmission system are ensured by increasing the copper-aluminum initial contact area in the copper-aluminum composite electric energy transmission system, and the increased welding energy demand caused by the increase of the initial contact area is ensured by increasing the welding energy for manufacturing the copper-aluminum composite electric energy transmission system, so that the copper-aluminum composite electric energy transmission system can be manufactured. However, by reducing the copper-aluminum initial contact area, the present disclosure not only significantly reduces the energy required for manufacturing the copper-aluminum composite electric energy transmission system, but also improves the mechanical and electrical properties of the copper-aluminum composite electric energy transmission system compared with the prior art, greatly prolongs the service life of the copper-aluminum composite electric energy transmission system, and reduces the manufacturing cost of the copper-aluminum composite electric energy transmission system. By providing the welding platform on the end of the copper terminal for being welded to the connecting piece, the present disclosure reduces the copper-aluminum initial contact area, increases the friction coefficient of the copper-aluminum contact surface, extends a path of the transition layer to resist an erosion from an external environment to the copper-aluminum composite electric energy transmission system, significantly improves the mechanical and electrical properties of the copper-aluminum composite electric power transmission system, effectively reduces the corrosion of copper and aluminum, greatly prolongs the service life of the copper-aluminum composite electric power transmission system, and remarkably reduces the demand on the energy for manufacturing the copper-aluminum composite electric power transmission system, so that the cost and fee of manufacturing the copper-aluminum composite electric power transmission system can be definitely reduced.

2. In the copper-aluminum composite electric energy transmission system of the present disclosure, the electric energy transmission aluminum piece and a front end of the aluminum conductor are welded to the copper terminal through the welding platform, so that the electric energy transmission aluminum piece and the aluminum conductor are further fused into a molten layer during welding. The molten layer destroys the dense oxide films on the surfaces of the electric energy transmission aluminum piece and the aluminum conductor, and improves the mechanical and electrical properties of the electric energy transmission aluminum piece and the aluminum conductor. Meanwhile, the Gibbs free energy of the molten layer is relatively low, so it is easier to form, together with the welding platform, a transition layer mainly composed of a copper-aluminum solid solution during manufacturing of the copper-aluminum composite electric energy transmission system, which reduces the weight ratio of the brittle copper-aluminum compound in the transition layer and improves the mechanical and electrical properties of the copper-aluminum welding joint.

3. In the copper-aluminum composite electric energy transmission system, the welding side of the copper terminal is provided with the welding platform, which increases the final contact area between the welding side of the copper terminal and the molten layer, reduces the internal stress generated during the copper-aluminum welding, and further enhances the mechanical property of the copper-aluminum welding side.

4. When the welding mode is friction welding, the welding platform causes a friction at the center positons of the welded copper and aluminum welding to generate energy, and then a friction at the root portion of the copper terminal to generate energy, so that the energy generated during friction is more uniform, and the copper-aluminum compounds with poor electrical properties generated during welding are reduced, thus improving the mechanical and electrical properties of the welding side and reducing the cost of manufacturing the copper-aluminum composite electric energy transmission system.

5. When the welding method is the ultrasonic welding, under the same pressure, the coefficient friction between the welding platform and the connecting piece increases, so that more heat is generated by friction, thus improving the mechanical and electrical properties of the welded side and reducing the cost of manufacturing the copper-aluminum composite electric energy transmission system.

6. When the welding mode is the resistance welding, the contact resistance between the welding platform and the connecting piece is large, and the generated energy is high, so that the stability of the welding energy is ensured, thus improving the mechanical and electrical properties of the welding side and reducing the cost of manufacturing the copper-aluminum composite electric energy transmission system.

7. The extension cladding layer of the present disclosure dads the outer side of the transition layer, which can effectively reduce the erosion of the external environment to the transition layer. In addition, the outer edge of the welding platform extends the erosion path of the external environment to the transition layer, increases the corrosion resistance of the copper-aluminum composite electric energy transmission system, and prolongs the service life of the copper-aluminum composite electric energy transmission system by about 20%.

8. In the copper-aluminum composite electric energy transmission system of the present disclosure, the welding platform can be obtained by processing the welding side of the copper terminal using a mechanical processing device before welding. During welding, the molten layer and the welding platform of the copper terminal form a transition layer with copper-aluminum atoms penetrating into or combined with each other under the pressure. The transition layer can effectively reduce the electrochemical corrosion between copper and aluminum, increase the weight percentage of the copper-aluminum solid solution, reduce the brittle copper-aluminum compounds, and prolong the service life of the copper-aluminum composite electric energy transmission system.

9. In the copper-aluminum composite electric energy transmission system of the present disclosure, a plating layer may be provided on the copper terminal, and the plating layer of the copper terminal is not removed before welding. During welding, the molten layer, the copper terminal and the plating layer form a transition layer with atoms of copper, aluminum and the metal of the plating layer penetrating into or combined with each other. The metal material with a potential between copper and aluminum or a metal material with a strong chemical stability may be selected as the material of the plating layer, which can reduce the electrochemical corrosion in the transition layer caused by a large potential between copper and aluminum, thus prolonging the service life of the copper-aluminum composite electric energy transmission system.

10. The copper-aluminum composite electric energy transmission system of the present disclosure may further include an aluminum cable with a shielding layer, which is mainly applied to a high-voltage wiring harness used by an electric vehicle. It is possible to decrease the weight of the wiring harness in the electric vehicle, reducing the energy consumption, while lowering the cost of the high-voltage wiring harness.

11. The processing method of the copper-aluminum composite electric energy transmission system of the present disclosure further includes a welding platform manufacturing step of processing an end surface of the copper terminal using a mechanical processing device to obtain the welding platform, which can significantly reduce the cost of manufacturing the copper-aluminum composite electric energy transmission system. The method of manufacturing the welding platform can also significantly improve the qualification rate of the copper-aluminum composite electric energy transmission system, thus further reducing the manufacturing fees.

Figure 1:
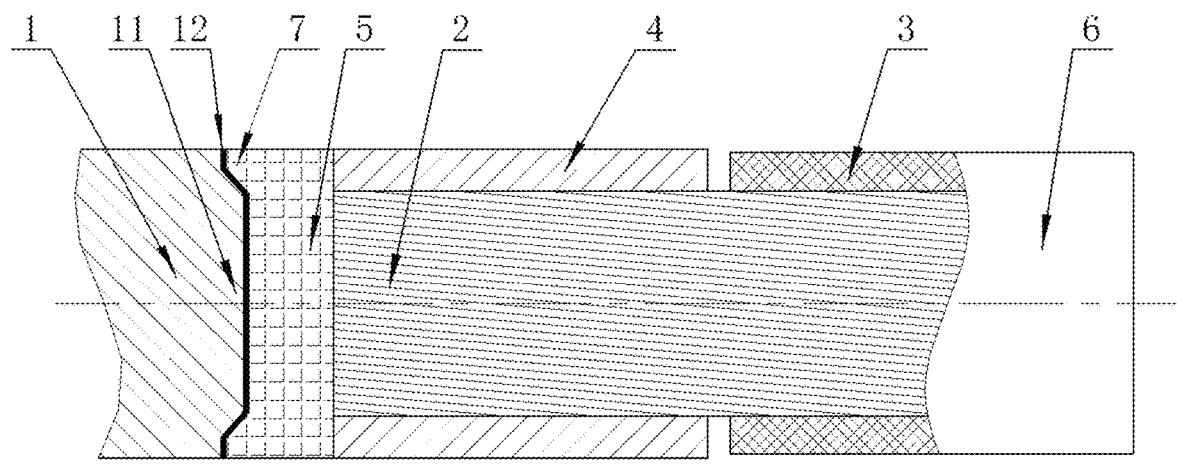
FIG. 1 illustrates a schematic structural diagram of butt welding of a copper-aluminum composite electric energy transmission system according to the present disclosure.

REFERENCE NUMERALS 1. copper terminal; 11. welding platform; 12. transition layer; 2. aluminum conductor;
3. insulation layer; 31. outer insulation layer;
4. electric energy transmission aluminum piece; 41. conductor crimping section; 42. transition section; 43. insulation layer crimping section;
5. molten layer; 6. aluminum cable; 7. extension cladding layer; 8. shielding layer.

DETAILED DESCRIPTION

In order to further explain the technical means adopted by the present disclosure to achieve the intended invention objective and effects thereof, the specific implementations, structures, characteristics and effects of the present disclosure will be described in detail below with reference to the drawings and the exemplary embodiments.

As illustrated in FIG. 1, a copper-aluminum composite electric energy transmission system includes a copper terminal 1 and an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 is wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

As a further exemplary solution, the electric energy transmission aluminum piece may be, but is not limited to, a conductive aluminum part of tubular shape.

In the present disclosure, the transition layer with metal atoms penetrating into or combined with each other means that the connecting piece and the copper terminal are in friction or energized by electric current or electric arcs to generate energy, and then pressed against each other under a pressure applied by a welding device. Therefore, copper and aluminum atoms at the welding interface penetrate into each other and dissolve in crystal lattices thereof under the energy to form a copper-aluminum solid solution. In addition, a small amount of copper and aluminum atoms may be bonded with each other by metal bonds to form a copper-aluminum compound.

Due to the large potential difference between copper and aluminum, the ordinary copper-aluminum electrical connection method will cause electrochemical corrosion, resulting in reduced service life. In the present disclosure, the transition layer with metal atoms penetrating into or combined with each other is formed between copper and aluminum, which can effectively reduce the electrochemical corrosion between copper and aluminum, prolong the service life of the copper-aluminum composite electric energy transmission system by about 20%, while improving the electrical and mechanical properties of the copper-aluminum connection.

Figure 5:
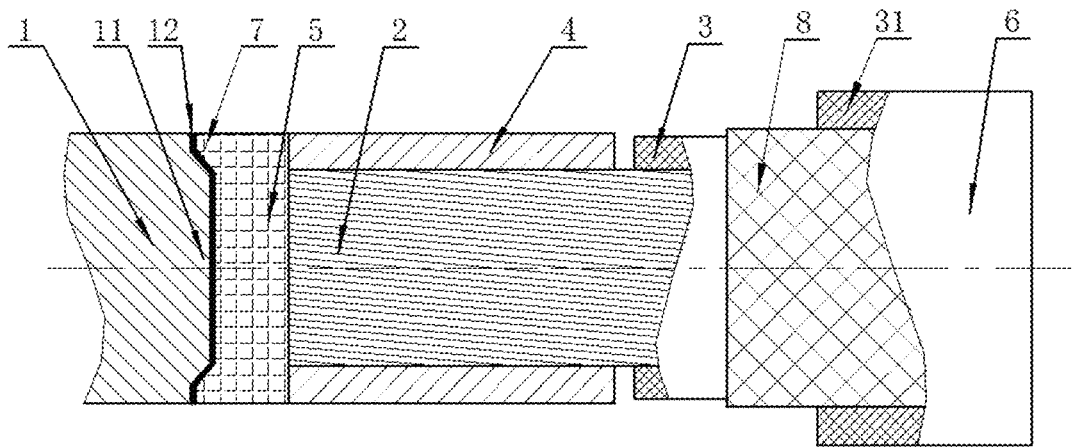
FIG. 5 illustrates a schematic structural diagram of butt welding of a copper-aluminum composite electric energy transmission system according to the present disclosure using an aluminum cable with a shielding layer and an outer insulation layer.
Figure 6:
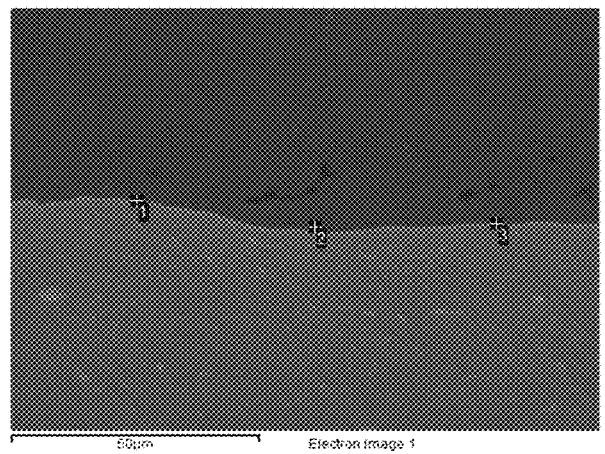
FIG. 6 illustrates an electron image of a transition layer according to the present disclosure.

FIGS. 5 and 6 illustrate electron images of the transition layer of a copper-aluminum welding interface. An X-ray energy spectrum diagram of the transition layer is given, which shows a general element distribution of the transition layer.

As a further solution, a front end of the connecting piece of the present disclosure is provided with a molten layer 5. There is no gap between the molten layer and either of the electric energy transmission aluminum piece and the aluminum conductor, which effectively ensures a seamless connection between the copper terminal and either of the electric energy transmission aluminum piece and the aluminum conductor, thereby further ensuring the mechanical and electrical properties of the copper-aluminum composite electric energy transmission system.

In the copper-aluminum composite electric energy transmission system, the electric energy transmission aluminum piece and a front end of the aluminum conductor are welded to the copper terminal through the welding platform, so that the electric energy transmission aluminum piece and the aluminum conductor are fused to form a molten layer during welding, which destroys the dense oxide films on the surfaces of the electric energy transmission aluminum piece and the aluminum conductor, thereby not only improving the mechanical and electrical properties of the electric energy transmission aluminum piece and the aluminum conductor, but also facilitating the formation of a transition layer in the subsequent welding process.

In an exemplary solution, the molten layer 5 of the present disclosure forms an extension cladding layer extending towards the copper terminal around an end surface of the welding platform 11.

Since the melting point of copper is 1083° C. and the melting point of aluminum is 660° C., the heat generated when the copper and aluminum are welded will firstly heat aluminum into a molten state to form a molten layer. The extension cladding layer 7, formed by the molten layer 5 extending towards the copper terminal around the end surface of the welding platform 11, can protect the welding seam of the copper-aluminum welding surface, so as to prevent the copper-aluminum welding surface from directly contacting the external environment during use, reduce the possibility of corrosion of the copper-aluminum welding surface, and prolong the service life of the copper-aluminum composite electric energy transmission system. In addition, with the welding method in the prior art, the molten layer will extend around under pressure to produce flashes, so an additional procedure has to be it added to cut off the flashes in the subsequent use process. However, the molten layer of the present disclosure directly forms the extension cladding layer towards the copper terminal in a fixture forming groove of the welding device, thus saving the procedure of cutting off the flashes and beautifying the appearance of the copper-aluminum composite electric energy transmission system.

In the present disclosure, the inventor found through researches that the thickness of the molten layer 5 influences the connection strength between the copper terminal 1 and either of the aluminum conductor 2 and the electric energy transmission aluminum piece 4. Specifically, when the thickness of the molten layer 5 is too small, due to an insufficient copper-aluminum friction strength or low electric current, the generated welding heat is not enough to melt adequate parts of the electric energy transmission aluminum piece 4 and the aluminum conductor 2, resulting in insufficient strengths of the molten layer 5 and the transition layer 12, which degrades the mechanical property of the copper-aluminum composite electric energy transmission system. In addition, when the thickness of the molten layer 5 is too small, the thickness of the transition layer 12 will be too small or even no transition layer 12 will be formed, which greatly increases the degree of electrochemical corrosion between copper and aluminum, thus degrading the electrical property and reducing the service life of the copper-aluminum composite electric energy transmission system. When the thickness of the molten layer 5 is too large, the generated welding heat is too high due to an excessive copper-aluminum friction strength or high electric current, so more parts of the electric energy transmission aluminum piece 4 and the aluminum conductor 2 are melted and then cooled, forming a metal structure with coarse crystal lattices and containing more copper-aluminum compounds. As a result, the mechanical strength of the molten layer 5 is not as good as those of the base materials of the electric energy transmission aluminum piece and the aluminum conductor 2, thus degrading the mechanical property of the copper-aluminum composite electric energy transmission system. Meanwhile, if the molten layer 5 and the transition layer 12 contain many copper-aluminum compounds with poor conductivity, the electrical property of the copper-aluminum composite electric energy transmission system is also degraded. Therefore, in the present disclosure, as a further exemplary solution, the thickness of the molten layer is 0.01 cm to 15 cm.

As a further solution, the extension cladding layer 7 clads at least to the end of the copper terminal.

According to the present disclosure, the extension cladding layer cladding to the end of the copper terminal can effectively prevent the external environment from eroding the transition layer. In addition, the outer edge of the welding platform extends an erosion path of the external environment to the transition layer, increases the corrosion resistance of the copper-aluminum composite electric energy transmission system, and prolongs the service life of the copper-aluminum composite electric energy transmission system by about 20%.

As a further solution, the welding platform of the present disclosure includes an end surface welded to the connecting piece and a root portion connected to the end of the copper terminal with a cross-sectional area of the end surface being smaller than that of the root portion. During welding, the end surface of the copper terminal in friction with the electric energy transmission aluminum piece and the aluminum cable is mainly the end surface of the welding platform. In order to generate enough friction energy, the end surface of the welding platform should not be too small. If the contact friction area of the copper and aluminum is too small, the thickness of the transition layer may be insufficient due to the insufficient welding energy, which will affect the mechanical and electrical properties of the welding joint. Therefore, in order to obtain a welding joint with better properties, the cross-sectional area of the end surface of the welding platform of the present disclosure is at least 50% of that of the root portion.

In the present disclosure, the welding surface of the copper terminal is provided with the welding platform. Therefore, when copper and aluminum are welded, on the one hand, energy is generated on the center of the welding platform firstly, then on a side surface thereof and finally on a bottom surface thereof. In other words, the higher the linear speed of the relative rotation, the shorter the welding time, so that the distribution of the energy generated during welding is more uniform, so as to reduce copper-aluminum compounds with a poor electrical property generated during welding, thereby improving the electrical property of the welding surface. On the other hand, by providing the welding platform at the end of the copper terminal, the contact area between the welding side of the copper terminal and the molten layer can be increased, the internal stress generated during copper-aluminum welding can be reduced, and the mechanical property of the welding side can be enhanced. In addition, the extension cladding layer of the present disclosure cladding the outer side of the transition layer can effectively reduce the erosion of the external environment on the transition layer. The outer edge of the welding platform extends an erosion path of the external environment to the transition layer, increases the corrosion resistance of the copper-aluminum composite electric energy transmission system, and prolongs the service life of the copper-aluminum composite electric energy transmission system by about 20%. Optionally, a height of the welding platform of the present disclosure is 0.01 cm to 15 cm.

As a further solution, the transition layer of the present disclosure contains a copper-aluminum solid solution not less than 10 wt %.

It should be noted that the transition layer at least contains simple copper, simple aluminum, a copper-aluminum solid solution, and a copper-aluminum compound. The copper-aluminum compound is one or more of $Cu_2Al$, $Cu_3Al_2$, $CuAl$ and $CuAl_2$. When the copper-aluminum solid solution contained in the transition layer is less than 10 wt %, other components in the transition layer are more than 90 wt %. The large proportions of the simple copper and the simple aluminum in the transition layer indicate that the copper-aluminum welding is insufficient, and the simple copper and the simple aluminum are not fused to form a copper-aluminum solid solution. The proportion of is large. Due to the poor electrical conductivity and high brittleness of the copper-aluminum compound, the large proportion of the copper-aluminum compound in the transition layer will reduce the mechanical and electrical properties of the copper-aluminum composite base material. Therefore, the transition layer of the present disclosure contains a copper-aluminum solid solution of at least 10 wt %.

As a further solution, the thickness of the transition layer of the present disclosure is 0.01 μm to 6,000 μm.

In the present disclosure, if the thickness of the transition layer 12 is too small, the electrochemical corrosion between copper and aluminum will be greatly increased, thus degrading the electrical property and the service life of the copper-aluminum composite electric energy transmission system. If the thickness of the transition layer 12 is too large, the electrical property of the copper-aluminum composite electric energy transmission system will also be degraded because of the inclusion of more copper-aluminum compounds with poor conductivity.

As a further solution, the surface of the copper terminal of the present disclosure is provided with a metal plating layer. Since the copper terminal needs to be connected to an electricity consuming device, it will be exposed to air and water, and even salt in the air in some places. As a result, the copper terminal may be subjected to an oxidization and a salt-spray corrosion, which will reduce the service life thereof. In severe cases, the copper terminal may be short-circuited and cause a burning accident, resulting in a greater loss. Therefore, the metal plating layer provided on the surface of the copper terminal can effectively prevent the erosion of air, water and salt spray, prolong the service life of the copper terminal and even the copper-aluminum joint, and reduce the safety accidents. A metal material with a potential between those of copper and aluminum may be selected as the metal material of the plating layer, so as to reduce the electrochemical corrosion in the transition layer caused by the large potential between copper and aluminum, thus prolonging the service life of the copper-aluminum composite electric energy transmission system. Therefore, optionally, in the present disclosure, the material of the metal plating layer contains, but is not limited to, one selected from the group of nickel, cadmium, zirconium, chromium, cobalt, manganese, aluminum, tin, titanium, zinc, copper, silver, and gold.

As a further solution, the aluminum cable of the present disclosure further includes a shielding layer 8 cladding a periphery of the insulation layer to shield an electromagnetic interference. The copper-aluminum composite electric energy transmission system, which includes an aluminum cable with a shielding layer, is mainly applied to a high-voltage wiring harness of an electric vehicle. Therefore, it is possible to decrease the weight of the wiring harness in the electric vehicle, reducing the energy consumption, while lowering the cost of the high-voltage wiring harness.

The present disclosure further discloses a processing method of a copper-aluminum composite electric energy transmission system. The processing method includes:
  a pre-assembling step: inserting a section of an aluminum conductor with an insulation layer stripped from an aluminum cable into an electric energy transmission aluminum piece, and pressing the section of the aluminum conductor into the electric energy transmission aluminum piece using a pressing device to form a connecting piece wrapped by the electric energy transmission aluminum piece; and
  a welding step: welding a copper terminal with a welding platform to the connecting piece, to form a transition layer with metal atoms penetrating into or combined with each other between the welding platform and the connecting piece.

As a further solution, the welding step of the present disclosure further includes: forming a molten layer at a front end of the connecting piece.

As a further solution, the processing method of the copper-aluminum composite electric energy transmission system of the present disclosure further includes:
- a welding platform manufacturing step: processing an end surface of the copper terminal using a mechanical processing device to obtain the welding platform.

The specific embodiments of the present disclosure are given as follows. In the following embodiments, the adopted devices, apparatuses, test methods, etc., which are not defined in the present disclosure, belong to the prior art.

The First Embodiment

As illustrated in FIG. 1, a copper-aluminum composite electric energy transmission system includes a copper terminal 1, and an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 is wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

In the copper-aluminum composite electric energy transmission system according to the embodiment, the electric energy transmission aluminum piece wraps the aluminum conductor to form the connecting piece, which has a simple structure and is easy to be processed, thereby greatly improving the production efficiency of the electric energy transmission aluminum piece, and reducing the manufacturing cost thereof.

The copper-aluminum composite electric energy transmission system is manufactured by the following process:
- a pre-assembling step: inserting a section of an aluminum conductor with an insulation layer stripped from an aluminum cable into an electric energy transmission aluminum piece, and pressing the section of the aluminum conductor into the electric energy transmission aluminum piece using a pressing device to form a connecting piece wrapped by the electric energy transmission aluminum piece;
- a clamping step: clamping a copper terminal with a welding platform into a rotary clamp of a friction welding device, and mounting the aluminum conductor and the electric energy transmission aluminum piece that have been processed by the pre-assembling step in a movable clamp;
- a welding step: driving, by the rotary clamp, the copper terminal to rotate with a rotating speed of 1000 R/Min; driving, by the movable clamp, the connecting piece to move horizontally and extrude the rotating copper terminal with a pressure of 10,000 N, so as to form a molten layer at a front end of the connecting piece through the heat generated by friction, then the molten layer dads the welding platform at a welding end of the copper terminal under the pressure, and forms, together with the welding platform, a transition layer with metal atoms penetrating into or combined with each other.

Figure 7:
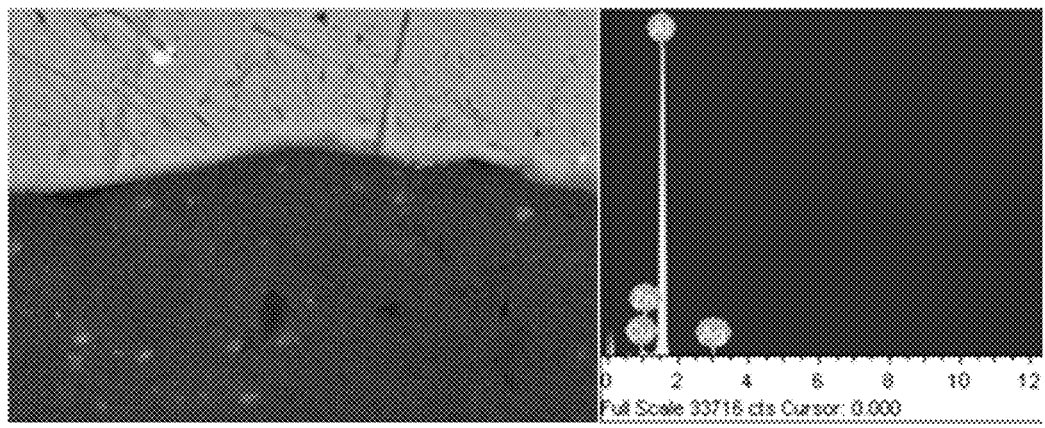
FIG. 7 illustrates an electron mirror image enlargement diagram and an X-ray energy spectrum diagram at a test point 1 in FIG. 5, where "a" illustrates the electron mirror image enlargement diagram and "b" illustrates the X-ray energy spectrum diagram.
Figure 8:
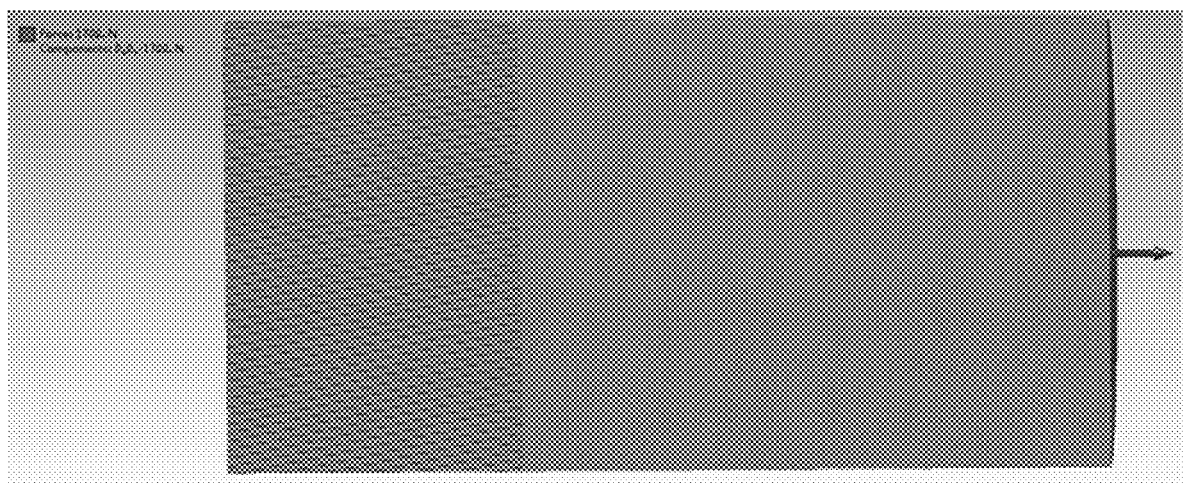
FIG. 8 illustrates a tensile force simulation experiment diagram of a copper-aluminum composite electric energy transmission system without a welding platform at a welding end of a copper terminal.
Figure 9:
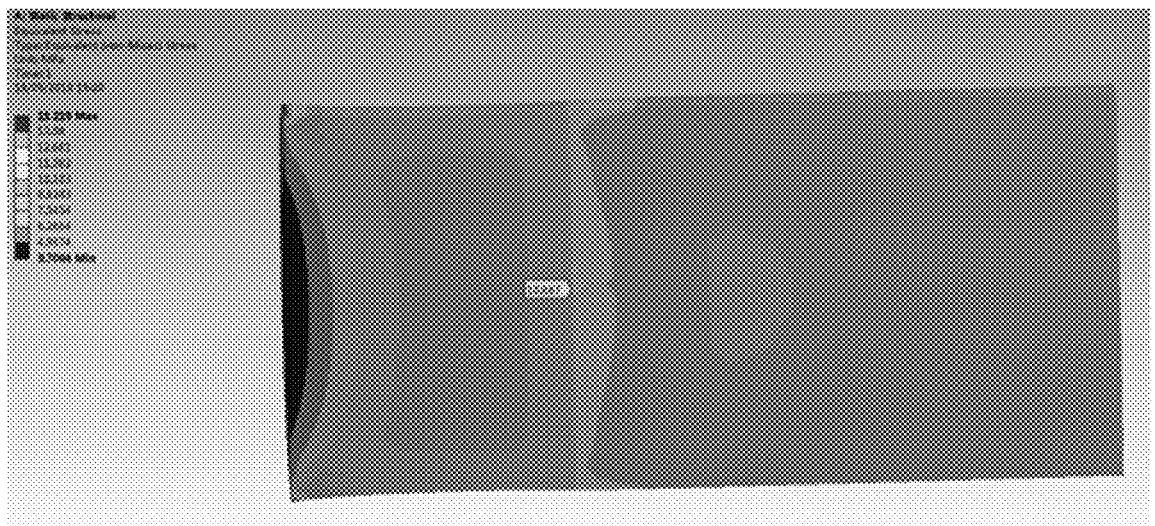
FIG. 9 illustrates a tensile force simulation experiment result diagram of a copper-aluminum composite electric energy transmission system without a welding platform at a welding end of a copper terminal.
Figure 10:
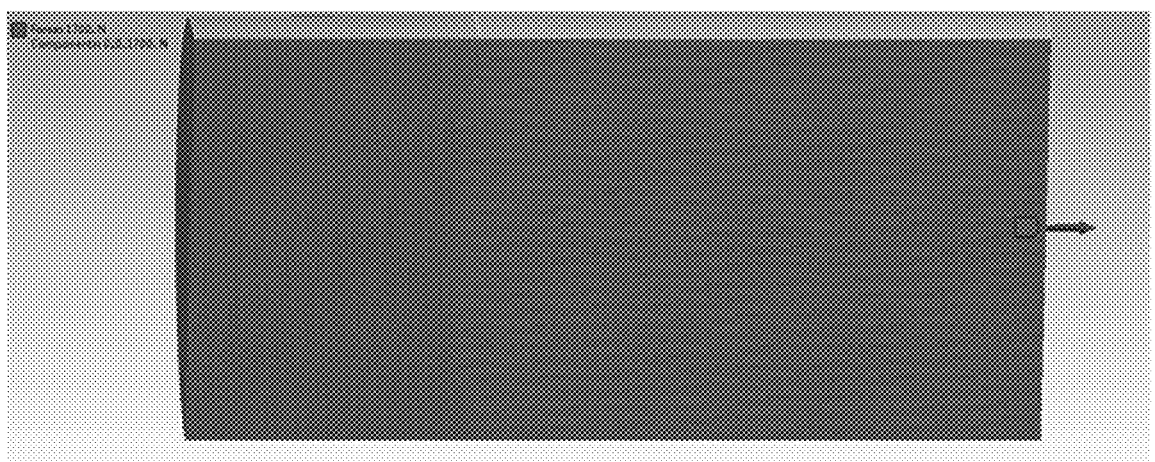
FIG. 10 illustrates a tensile force simulation experiment diagram of a copper-aluminum composite electric energy transmission system with a welding platform at a welding end of a copper terminal.
Figure 11:
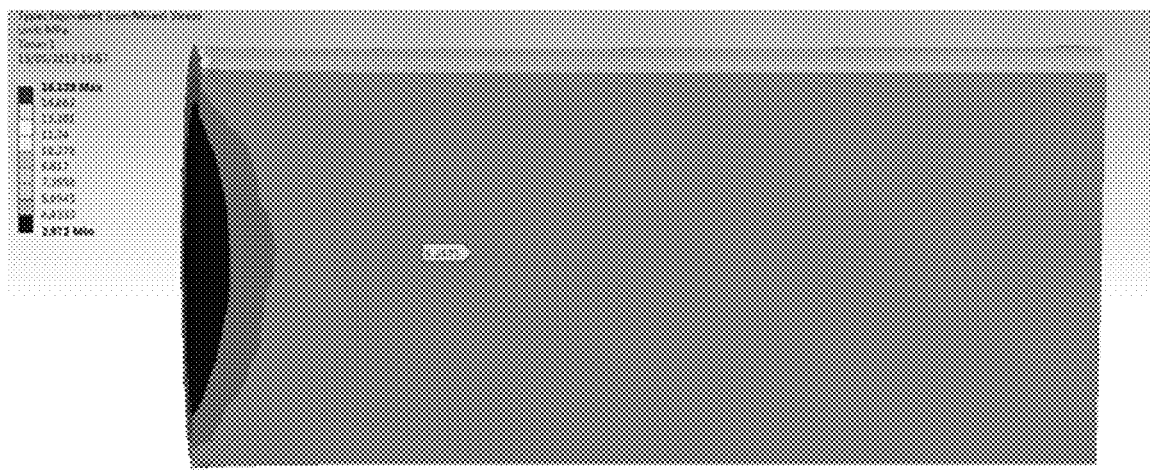
FIG. 11 illustrates a tensile force simulation experiment result diagram of a copper-aluminum composite electric energy transmission system with a welding platform at a welding end of a copper terminal.

In this embodiment, the inventor tests the structure of the transition layer, and the test results are illustrated in FIGS. 6 and 7.

The Second Embodiment

As illustrated in FIG. 1, a copper-aluminum composite electric energy transmission system includes a copper terminal 1 and an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 is wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

The copper-aluminum composite electric energy transmission system is manufactured by the following process:
- a pre-assembling step: inserting a section of an aluminum conductor with an insulation layer stripped from an aluminum cable into an electric energy transmission aluminum piece, and pressing the section of the aluminum conductor into the electric energy transmission aluminum piece using a pressing device to form a connecting piece wrapped by the electric energy transmission aluminum piece;
- a clamping step: clamping a copper terminal with a welding platform into a rotary clamp of a friction welding device, and mounting the aluminum conductor and the electric energy transmission aluminum piece that have been processed by the pre-assembling step in a movable clamp;
- a welding step: driving, by the rotary clamp, the copper terminal to rotate with a rotating speed of 1000 R/Min; driving, by the movable clamp, the connecting piece to move horizontally and extrude the rotating copper terminal with a pressure of 10,000 N, so as to form a molten layer at a front end of the connecting piece through the heat generated by friction, then the molten layer dads the welding platform at a welding end of the copper terminal under the pressure, and forms, together with the welding platform, a transition layer with metal atoms penetrating into or combined with each other.

Further, in order to demonstrate influences on the mechanical and electrical properties of the copper-aluminum composite electric energy transmission system when the welding end of the copper terminal is provided with and not provided with the welding platform, the inventor carries out a series of experiments on the mechanical and electrical properties and the service life of the above two different copper-aluminum composite electric energy transmission systems.

The specific experimental procedure is as follows: the actual use environment of the copper-aluminum composite electric energy transmission system is simulated, but the test conditions are increased to a level much stricter than those of the actual use environment, so as to obtain the test results in a short time, which can be achieved for a long time under the actual use environment. The series of experiments include: 1) testing the initial pullout force and voltage drop to obtain the initial properties of the copper-aluminum composite electric energy transmission system; 2) carrying out a salt spray experiment for 1,000 hours, by spraying salt water onto the copper-aluminum composite electric energy transmission system using a salt spray experimental box, which can replace the salt spray resistance test for ten years in the actual coastal environment; 3) carrying out a high and low temperature experiment for 200 hours, by putting the copper-aluminum composite electric energy transmission system under the highest and lowest temperatures of the use environment for one hour respectively, with a temperature switching time of less than 5 seconds, and performing 100 cycles, which can replace the high and low temperature resistance test for 10 years in the external cold-hot alternate environment; 4) carrying out a vibration test for 120 hours, by fixing the copper-aluminum composite electric energy transmission system on a vibration experiment table, selecting a vibration amplitude depending on the use environment, and vibrating the copper-aluminum composite electric energy transmission system in three directions, which can replace the vibration test for 10 years in the actual vibration environment; and 5) carrying out an aging test for 6,000 hours, by putting the copper-aluminum composite electric energy transmission system into an aging experiment box to simulate an environment exceeding the rated use conditions, which can replace the aging test for 20 years in the actual use environment. After each experiment, it is necessary to test the voltage drop and the pullout force of the copper-aluminum composite electric energy transmission system. See Tables 1-1, 1-2 and 1-3 for the experimental results.

TABLE 1-1

Influence of the welding platform of the copper terminal on the pullout force and the voltage drop of the copper-aluminum composite electric energy transmission system (before experiment and after 1,000 hours of salt spray experiment)

| | Type of the copper terminal | | | |
|---|---|---|---|---|
| | The welding end is not provided with the welding platform | The welding end is provided with the welding platform | The welding end is not provided with the welding platform | The welding end is provided with the welding platform |
| | State | | | |
| | After the welding is completed | | After 1,000 hours of salt spray experiment | |
| Experiment | Pullout force (N) / Voltage drop (mV) | Pullout force (N) / Voltage drop (mV) | Pullout force (N) / Voltage drop (mV) | Pullout force (N) / Voltage drop (mV) |

| Experiment | Pullout force (N) | Voltage drop (mV) | Pullout force (N) | Voltage drop (mV) | Pullout force (N) | Voltage drop (mV) | Pullout force (N) | Voltage drop (mV) |
|---|---|---|---|---|---|---|---|---|
| 1 | 2345 | 0.36 | 3125 | 0.31 | 2056 | 0.42 | 2684 | 0.37 |
| 2 | 2561 | 0.37 | 3086 | 0.29 | 2136 | 0.46 | 2743 | 0.37 |
| 3 | 2472 | 0.36 | 3147 | 0.30 | 2182 | 0.45 | 2756 | 0.35 |
| 4 | 2544 | 0.38 | 3258 | 0.31 | 2164 | 0.45 | 2834 | 0.36 |
| 5 | 2342 | 0.36 | 3182 | 0.30 | 2084 | 0.43 | 2846 | 0.36 |
| 6 | 2465 | 0.39 | 3146 | 0.29 | 2126 | 0.46 | 2913 | 0.37 |
| 7 | 2385 | 0.37 | 3247 | 0.28 | 2067 | 0.45 | 2697 | 0.36 |
| 8 | 2556 | 0.36 | 3081 | 0.29 | 2081 | 0.43 | 2789 | 0.35 |
| 9 | 2483 | 0.38 | 3167 | 0.30 | 2164 | 0.45 | 2775 | 0.38 |
| 10 | 2459 | 0.37 | 3192 | 0.31 | 2185 | 0.46 | 2864 | 0.35 |
| Average value | 2461.2 | 0.37 | 3163.1 | 0.298 | 2124.5 | 0.446 | 2790.1 | 0.362 |

TABLE 1-2

Influence of the welding platform of the copper terminal on the pullout force and the voltage drop of the copper-aluminum composite electric energy transmission system (200 hours of high and low temperature experiment and 120 hours of vibration)

| | Type of the copper terminal | | | |
|---|---|---|---|---|
| | The welding end is not provided with the welding platform | The welding end is provided with the welding platform | The welding end is not provided with the welding platform | The welding end is provided with the welding platform |
| | State | | | |
| | After 200 hours of high and low temp. experiment | | After 20 hours of vibration experiment | |

| Experiment | Pullout force (N) | Voltage drop (mV) | Pullout force (N) | Voltage drop (mV) | Pullout force (N) | Voltage drop (mV) | Pullout force (N) | Voltage drop (mV) |
|---|---|---|---|---|---|---|---|---|
| 1 | 2142 | 0.42 | 2592 | 0.36 | 2175 | 0.41 | 2735 | 0.35 |
| 2 | 2076 | 0.45 | 2683 | 0.38 | 2148 | 0.43 | 2853 | 0.36 |
| 3 | 2128 | 0.43 | 2658 | 0.35 | 2136 | 0.46 | 2689 | 0.34 |
| 4 | 2054 | 0.46 | 2715 | 0.37 | 2072 | 0.44 | 2755 | 0.37 |
| 5 | 2074 | 0.42 | 2784 | 0.36 | 2095 | 0.46 | 2774 | 0.34 |
| 6 | 2058 | 0.43 | 2588 | 0.37 | 2146 | 0.44 | 2896 | 0.33 |
| 7 | 2093 | 0.46 | 2649 | 0.38 | 2090 | 0.42 | 2915 | 0.38 |
| 8 | 2126 | 0.45 | 2768 | 0.39 | 2085 | 0.46 | 2832 | 0.36 |
| 9 | 2155 | 0.42 | 2659 | 0.36 | 2136 | 0.44 | 2679 | 0.34 |

TABLE 1-2-continued

Influence of the welding platform of the copper terminal on the pullout force and
the voltage drop of the copper-aluminum composite electric energy transmission system
(200 hours of high and low temperature experiment and 120 hours of vibration)

| | Type of the copper terminal | | | | | | | |
|---|---|---|---|---|---|---|---|---|
| | The welding end is not provided with the welding platform | | The welding end is provided with the welding platform | | The welding end is not provided with the welding platform | | The welding end is provided with the welding platform | |
| | State | | | | | | | |
| | After 200 hours of high and low temp. experiment | | | | After 20 hours of vibration experiment | | | |
| Experiment | Pullout force (N) | Voltage drop (mV) | Pullout force (N) | Voltage drop (mV) | Pullout force (N) | Voltage drop (mV) | Pullout force (N) | Voltage drop (mV) |
| 10 | 2162 | 0.44 | 2586 | 0.35 | 2147 | 0.42 | 2947 | 0.38 |
| Average value | 2106.8 | 0.438 | 2668.2 | 0.367 | 2123 | 0.438 | 2807.5 | 0.355 |

TABLE 1-3

Influence of the welding platform of the copper terminal on the pullout
force and the voltage drop of the copper-aluminum composite electric
energy transmission system (600 hours of aging experiment)

| | Type of the copper terminal | | | |
|---|---|---|---|---|
| | The welding end is not provided with the welding platform | | The welding end is provided with the welding platform | |
| | State | | | |
| | After 600 hours of aging experiment | | | |
| Experiment | Pullout force (N) | Voltage drop (mV) | Pullout force (N) | Voltage drop (mV) |
| 1 | 2079 | 0.48 | 2847 | 0.35 |
| 2 | 2137 | 0.46 | 2785 | 0.37 |
| 3 | 2025 | 0.47 | 2856 | 0.35 |
| 4 | 2142 | 0.48 | 2780 | 0.36 |
| 5 | 2076 | 0.49 | 2885 | 0.34 |
| 6 | 2048 | 0.48 | 2935 | 0.36 |
| 7 | 2055 | 0.47 | 2918 | 0.37 |
| 8 | 2137 | 0.48 | 2768 | 0.36 |
| 9 | 2038 | 0.48 | 2867 | 0.38 |
| 10 | 2147 | 0.47 | 2964 | 0.36 |
| Average value | 2088.4 | 0.476 | 2860.5 | 0.36 |

As can be seen from the results in the above Tables 1-1, 1-2 and 1-3, the copper-aluminum composite electric energy transmission system in which the welding end of the copper terminal is provided with the welding platform has a much higher initial pullout force and a smaller voltage drop than the copper-aluminum composite electric energy transmission system in which the welding end of the copper terminal is not provided with the welding platform. After being subjected to 1,000 hours of salt spray experiment, 200 hours of high and low temperature experiment, 120 hours of vibration experiment and 6,000 hours aging experiment, the copper-aluminum composite electric energy transmission system in which the welding end of the copper terminal is provided with the welding platform still has a pullout force higher than the initial pullout force of the copper-aluminum composite electric energy transmission system in which the welding end of the copper terminal is not provided with the welding platform. After being subjected to the experiments, the copper-aluminum composite electric energy transmission system in which the welding end of the copper terminal is not provided with the welding platform has an obviously low pullout force and unstable mechanical property, which may cause the copper-aluminum composite electric energy transmission system to break away, resulting in a cable short circuit, which causes a functional failure and even a burning accident in serious cases. After being subjected to the experiments, the copper-aluminum composite electric energy transmission system in which the welding end of the copper terminal is provided with the welding platform has a voltage drop substantially the same as the initial voltage drop of the copper-aluminum composite electric energy transmission system in which the welding end of the copper terminal is not provided with the welding platform. After being subjected to the experiments, the copper-aluminum composite electric energy transmission system in which the welding end of the copper terminal is not provided with the welding platform has an obviously decreased voltage drop, unstable electrical property; in addition, the contact resistance of the copper-aluminum composite electric energy transmission system increases, so when being electrically conductive, the copper-aluminum composite electric energy transmission system will become hot and red, and even burn due to excessive temperature in severe cases, resulting in serious accidents.

The Third Embodiment

Figure 2:
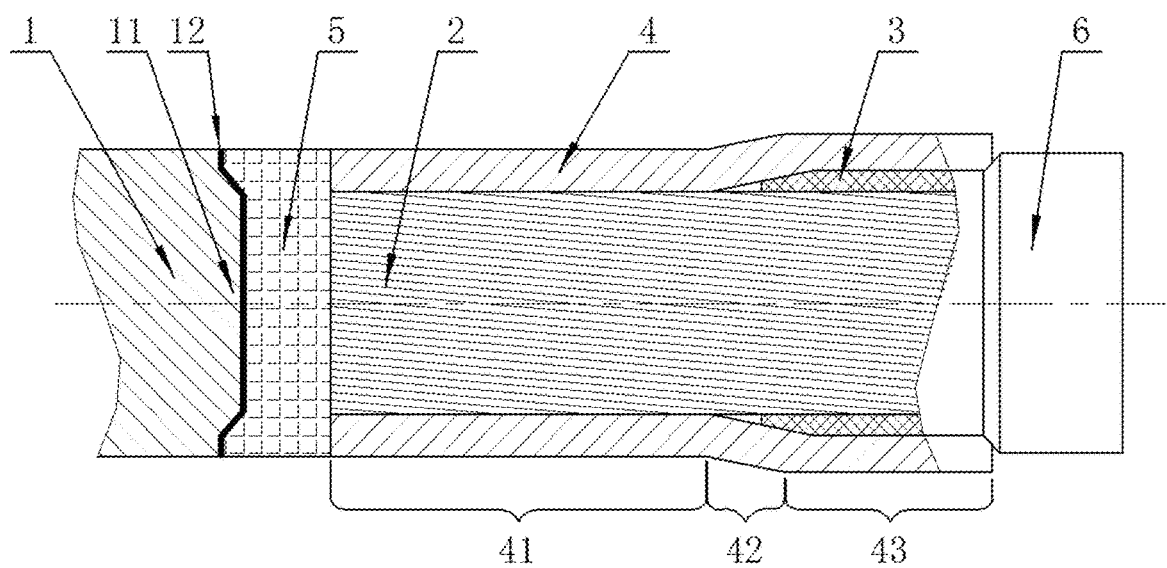
FIG. 2 illustrates a schematic structural diagram of butt welding of a copper-aluminum composite electric energy transmission system according to the present disclosure.
Figure 3:
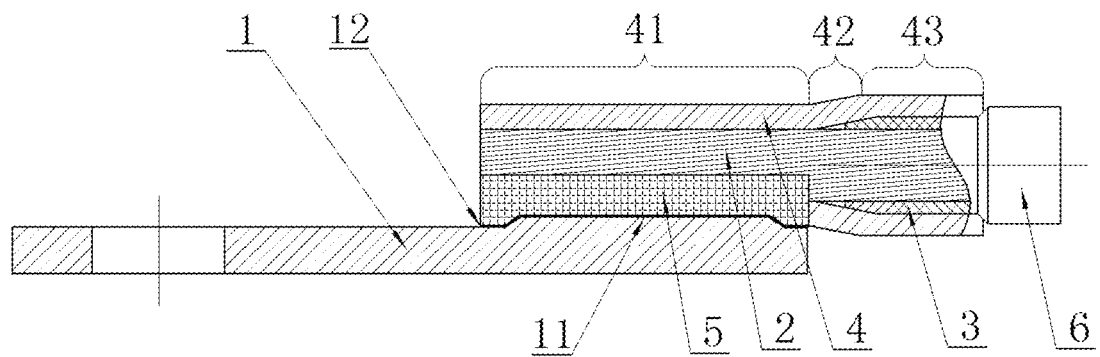
FIG. 3 illustrates a schematic structural diagram of overlap welding of a copper-aluminum composite electric energy transmission system according to the present disclosure.

As illustrated in FIGS. 2 and 3, a copper-aluminum composite electric energy transmission system includes a copper terminal 1 and an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 and at least part of the aluminum conductor clad with the insulation layer 3 are wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

As a further solution, as illustrated in FIGS. 2 and 3, the electric energy transmission aluminum piece of the present disclosure includes a conductor crimping section 41, an insulation layer crimping section 43 and a transition section 42. An inner diameter of the insulation layer crimping section 43 is larger than that of the conductor crimping section 41. The conductor crimping section 41 and the insulation layer crimping section 43 are connected to each other by the transition section 42 of stepped shape. The aluminum conductor 2 is fitted and sleeved inside the conductor crimping section 41. The insulation layer 3 and the insulation layer crimping section 43 are in interference fit. A front end of the insulation layer 3 does not enter the conductor crimping section 41. In this solution, the interference fit between the insulation layer and the electric energy transmission aluminum piece further avoids a gap from being generated between the electric energy transmission aluminum piece and the aluminum conductor, eliminates the possibility for air and moisture to enter the electric energy transmission aluminum piece, and effectively avoids the metal corrosion. The front end of the insulation layer is located inside the transition section, so the stepped transition section can accommodate the insulation layer which is deformed and extended in a crimping process, so as to prevent the insulation layer from being pressed into the conductor to cause a resistance increase or cause heating or even burning of the copper-aluminum composite electric energy transmission system.

The copper-aluminum composite electric energy transmission system is manufactured by the following process:
a pre-assembling step: inserting a section of an aluminum conductor with an insulation layer stripped from an aluminum cable into the electric energy transmission aluminum piece, and pressing the section of the aluminum conductor with the insulation layer stripped from the aluminum cable and a part of the aluminum conductor clad with the insulation layer into the electric energy transmission aluminum piece using a pressing device to form a connecting piece;
a clamping step: clamping a copper terminal with a welding platform into a rotary clamp of a friction welding device, and mounting the connecting piece that have been processed by the pre-assembling step in a movable clamp;
a welding step: driving, by the rotary clamp, the copper terminal to rotate with a rotating speed of 1000 R/Min; driving, by the movable clamp, the connecting piece to move horizontally and extrude the rotating copper terminal with a pressure of 10,000 N, so as to form a molten layer at a front end of the connecting piece through the heat generated by friction, then the molten layer dads the welding platform at a welding end of the copper terminal under the pressure, and forms, together with the welding platform, a transition layer with metal atoms penetrating into or combined with each other.

In this embodiment, in order to investigate the influence of the welding platform on the welding effect of the copper terminal and the property of the welding joint, the inventor respectively adopts a copper terminal with a welding platform and a copper terminal without a welding platform to obtain copper-aluminum composite electric energy transmission systems according to the above method, in which the copper terminal without a welding platform directly forms a transition layer with a front end of the connecting piece on which the molten layer has been formed. A tensile force simulation experiment is carried out on the two different copper-aluminum composite electric energy transmission systems through simulation software Ansys. The method for simulation experiment is to import mathematical models of the copper terminal with a welding platform, the copper terminal without a welding platform, and the front end of the connecting piece on which the molten layer has been formed into the simulation software, respectively, then apply a tensile force of 1,700N to both ends of the copper terminal and the connecting piece, and then the software automatically simulates an internal stress at an interface. As the internal stress increases, the welding is increasingly unstable, and the pullout force decreases. See FIGS. 8 to 11 for the procedure and results of the tensile force simulation experiment.

As can be seen from the results in FIGS. 8 to 11, when the welding end of the copper terminal is not provided with the welding platform, the internal stress of the joint is 10.887 Mpa, and when the welding end of the copper terminal is provided with the welding platform, the internal stress of the joint is 8.2405 Mpa. The internal stress at the welding seam shows that as compared with the situation where the welding end of the copper terminal is not provided with the welding platform, the internal stress of the joint is reduced by 24.3% when the welding end of the copper terminal is provided with the welding platform. As the internal stress decreases, the copper-aluminum composite electric energy transmission system is less likely to break during pulling, which indicates that the copper-aluminum composite electric energy transmission system in which the welding end of the copper terminal is provided with the welding platform obviously has a better welding property.

The Fourth Embodiment

As illustrated in FIG. 3, a copper-aluminum composite electric energy transmission system includes a copper terminal land an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 and at least part of the aluminum conductor clad with the insulation layer 3 are wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

The copper-aluminum composite electric energy transmission system is manufactured by the following process:

a pre-assembling step: inserting a section of an aluminum conductor with an insulation layer stripped from an aluminum cable into an electric energy transmission aluminum piece, and pressing the section of the aluminum conductor with the insulation layer stripped from the aluminum cable and a part of the aluminum conductor clad with the insulation layer into the electric energy transmission aluminum piece using a pressing device to form the connecting piece;

a clamping step: clamping a copper terminal with a welding platform into a fixed clamp of an ultrasound device, and mounting the connecting piece that have been processed by the pre-assembling step in a vibration clamp of the ultrasound device;

a welding step: fixing, by the fixed clamp, the copper terminal in the fixed clamp; driving, by vibration clamp, the connecting piece to vibrate horizontally with a frequency of 200 KHz and extrude the fixed copper terminal with a pressure of 10,000 N, so as to form a molten layer at a front end of the connecting piece through the heat generated by vibration friction, then the molten layer dads the welding platform at a welding end of the copper terminal under the pressure, and forms, together with the welding platform, a transition layer with metal atoms penetrating into or combined with each other.

The objective of this embodiment is to demonstrate influences of different thicknesses of the molten layer on the pullout force, the voltage drop, and the welding strength of the copper-aluminum composite electric energy transmission system. The inventor investigates the pullout forces, the voltage drops and the welding strengths of the copper-aluminum composite electric energy transmission system at different thicknesses of the molten layer, and the results are shown in Table 2.

ties of the copper-aluminum composite electric energy transmission system after welding are relatively weak.

When the thickness of the molten layer is more than 15 cm, the pullout force decreases obviously and the voltage drop increases obviously, so the properties of the corresponding copper-aluminum composite electric energy transmission system are relatively poor, and the heat generated by the copper-aluminum friction increases. During the friction welding, more parts of the front end of the connecting piece are melted and then cooled, forming a metal structure with coarse crystal lattices and undesirably generating more copper-aluminum compounds with poor conductivity, which leads to a decline trend in the mechanical and electrical properties of the copper-aluminum composite electric energy transmission system.

Therefore, in the present disclosure, exemplarily, the thickness of the molten layer is 0.01 cm to 15 cm, so that the copper-aluminum composite electric energy transmission system has obvious advantages in the pullout force, the voltage drop and the welding strength.

The Fifth Embodiment

As illustrated in FIG. 3, a copper-aluminum composite electric energy transmission system includes a copper terminal 1 and an aluminum cable 6. The aluminum cable 6 includes an aluminum conductor 2 and an insulation layer 3 cladding a periphery of the aluminum conductor 2. The system further includes an electric energy transmission aluminum piece 4. A section of the aluminum conductor 2 with the insulation layer 3 stripped from the aluminum cable 6 and at least part of the aluminum conductor clad with the insulation layer 3 are wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

The copper-aluminum composite electric energy transmission system is manufactured by the following process:

TABLE 2

Influences of different thicknesses of the molten layer on the pullout force and the voltage drop of the copper-aluminum composite electric energy transmission system

| No. | Different thicknesses of the molten layer (cm) | | | | | | | | | | | | | |
|---|---|---|---|---|---|---|---|---|---|---|---|---|---|---|
| | 0.001 | 0.005 | 0.01 | 0.05 | 0.1 | 0.5 | 1 | 5 | 9 | 11 | 13 | 15 | 16 | 17 |
| | Pullout force of the copper-aluminum composite electric energy transmission system (N) | | | | | | | | | | | | | |
| 1 | 1273 | 1547 | 2054 | 2248 | 2488 | 2674 | 2824 | 3024 | 2759 | 2494 | 2285 | 2076 | 1458 | 1175 |
| | Voltage drop of the copper-aluminum composite electric energy transmission system (mV) | | | | | | | | | | | | | |
| 2 | 0.78 | 0.71 | 0.49 | 0.43 | 0.37 | 0.34 | 0.32 | 0.31 | 0.35 | 0.38 | 0.42 | 0.48 | 0.62 | 0.79 |

As can be seen from the above table, when the thickness of the molten layer is less than 0.01 cm, the pullout force is obviously low but the voltage drop is high, so the properties of the corresponding copper-aluminum composite electric energy transmission system are relatively poor. Meanwhile, since the thickness of the molten layer is too small, the heat generated by the copper-aluminum friction is little, the strengths of the molten layer and the transition layer of the copper-aluminum composite electric energy transmission system are weak, and the mechanical and electrical propera pre-assembling step: inserting a section of an aluminum conductor with an insulation layer stripped from an aluminum cable into the electric energy transmission aluminum piece, and pressing the section of the aluminum conductor with the insulation layer stripped from the aluminum cable and a part of the aluminum conductor clad with the insulation layer into the electric energy transmission aluminum piece using a pressing device to form a connecting piece;

a clamping step: clamping the copper terminal with the welding platform into a lower electrode of a resistance welding device, and mounting the connecting piece that have been processed by the pre-assembling step in an upper electrode of the resistance welding device;

a welding step: fixing the copper terminal in the lower electrode, and driving, by the upper electrode, the connecting piece to move downward and electrify and extrude the fixed copper terminal, wherein an electric current applied by the resistance welding device is 40 KA, and a pressure applied by the upper electrode is 10,000 N; a molten layer is formed at a front end of the connecting piece through the heat generated by contact resistance conduction, then the molten layer dads the welding platform at a welding end of the copper terminal under the pressure, and forms, together with the welding platform, a transition layer with metal atoms penetrating into or combined with each other.

In this embodiment, in order to demonstrate the influence of the height of the welding platform on the pullout force, the voltage drop and the welding strength of the copper-aluminum composite electric energy transmission system, the inventor investigates the pullout forces, the voltage drops and the welding strengths of the copper-aluminum composite electric energy transmission system at different heights of the welding platform, and the results are shown in Table 3.

TABLE 3

Influences of Different Heights of the Welding Platform on the Pullout Force and the Voltage Drop of the Copper-Aluminum Composite Electric Energy Transmission System

| No. | Height of the welding platform (cm) | | | | | | | | | | | | | | |
|---|---|---|---|---|---|---|---|---|---|---|---|---|---|---|---|
| | 0 | 0.001 | 0.005 | 0.01 | 0.05 | 0.1 | 0.5 | 1 | 5 | 9 | 11 | 13 | 15 | 16 | 17 |
| | Pullout force of the copper-aluminum composite electric energy transmission system (N) | | | | | | | | | | | | | | |
| 1 | 2016 | 2020 | 2027 | 2164 | 2273 | 2467 | 2569 | 2682 | 2569 | 2486 | 2368 | 2274 | 2186 | 1738 | 1345 |
| | Voltage drop of the copper-aluminum composite electric energy transmission system (mV) | | | | | | | | | | | | | | |
| 2 | 0.49 | 0.48 | 0.48 | 0.46 | 0.42 | 0.38 | 0.36 | 0.32 | 0.37 | 0.39 | 0.42 | 0.46 | 0.49 | 0.62 | 0.79 |

The results in Table 3 show that when the height of the welding platform is less than 0.01 cm, the welding end surfaces are nearly flush, and then the mechanical and electrical properties of the copper-aluminum composite electric energy transmission system are at a low level. When the height of the welding platform is more than 15 cm, in order to make the welding end surfaces of the molten layer and the copper terminal fully contact and form the transition layer, the welding device is required to provide higher friction heat and pressure, and the heat and pressures acting on the end surface and the bottom surface of the welding platform are inconsistent, resulting in the uneven thicknesses of the molten layer and the transition layer and the increased contact resistance, which leads to a decline trend in the mechanical and electrical properties of the copper-aluminum composite electric energy transmission system.

Further, in this embodiment, in order to demonstrate the influence of the end surface area of the welding platform on the pullout force, the voltage drop and the welding strength of the copper-aluminum composite electric energy transmission system, the inventor investigates the pullout forces, the voltage drops and the welding strengths of the copper-aluminum composite electric energy transmission system at different end surface areas of the welding platform, and the results are shown in Table 4.

TABLE 4

Influences of different ratios of the cross-sectional area of the end surface to the cross-sectional area of the root of the welding platform on the pullout force and the voltage drop of the copper-aluminum composite electric energy transmission system

| No. | Ratio of the cross-sectional area of the end surface to the cross-sectional area of the root of the welding platform (%) | | | | | | | | | |
|---|---|---|---|---|---|---|---|---|---|---|
| | 35 | 40 | 45 | 50 | 55 | 60 | 70 | 80 | 90 | 95 |
| | Pullout force of the copper-aluminum composite electric energy transmission system (N) | | | | | | | | | |
| 1 | 1738 | 1862 | 1985 | 2128 | 2237 | 2345 | 2416 | 2493 | 2371 | 2256 |

TABLE 4-continued

Influences of different ratios of the cross-sectional area of the end surface to the cross-sectional area of the root of the welding platform on the pullout force and the voltage drop of the copper-aluminum composite electric energy transmission system

| | Ratio of the cross-sectional area of the end surface to the cross-sectional area of the root of the welding platform (%) | | | | | | | | | |
|---|---|---|---|---|---|---|---|---|---|---|
| No. | 35 | 40 | 45 | 50 | 55 | 60 | 70 | 80 | 90 | 95 |
| | Voltage drop of the copper-aluminum composite electric energy transmission system (mV) | | | | | | | | | |
| 2 | 0.63 | 0.58 | 0.52 | 0.47 | 0.38 | 0.37 | 0.35 | 0.34 | 0.38 | 0.45 |

As can be seen from the results in Table 4, in order to generate enough friction heat, the end surface of the welding platform should not be too small. When the copper-aluminum contact friction area is more than 50% in the welding process, a copper-aluminum joint with excellent electrical and mechanical properties can be obtained.

The Sixth Embodiment

Figure 4:
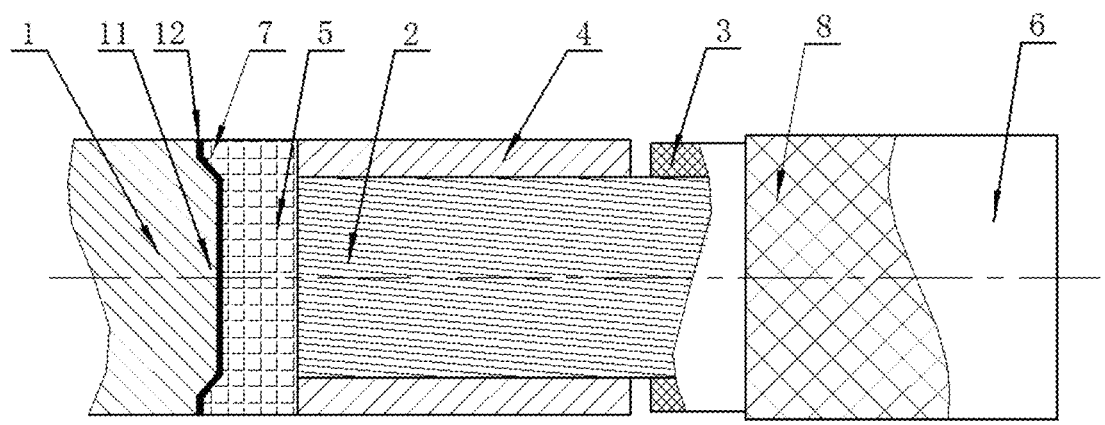
FIG. 4 illustrates a schematic structural diagram of butt welding of a copper-aluminum composite electric energy transmission system according to the present disclosure using an aluminum cable with a shielding layer.

As illustrated in FIG. 4, a copper-aluminum composite electric energy transmission system includes a copper terminal 1 and an aluminum cable 6. The aluminum cable 6 includes an aluminum conductor 2, an insulation layer 3 cladding a periphery of the aluminum conductor 2. and a shielding layer 8 cladding a periphery of the insulation layer 3 to shield an electromagnetic interference. The system further includes an electric energy transmission aluminum piece 4. A section of the aluminum conductor 2 with the insulation layer 3 stripped from the aluminum cable 6 is wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

In the copper-aluminum composite electric energy transmission system of the present disclosure, the electric energy transmission aluminum piece wraps the aluminum conductor to form the connecting piece, which has a simple structure and is easy to be processed, thereby greatly improving the production efficiency of the electric energy transmission aluminum piece, and reducing the manufacturing cost thereof.

The copper-aluminum composite electric energy transmission system is manufactured by the following process:

a pre-assembling step: inserting a section of an aluminum conductor 2 with an insulation layer 3 stripped from an aluminum cable into the electric energy transmission aluminum piece 4, and pressing the aluminum conductor 2 with the insulation layer 3 stripped from the aluminum cable into the electric energy transmission aluminum piece 4 using a pressing device to form the connecting piece;

a clamping step: clamping a copper terminal 1 with a welding platform into a rotary clamp of a friction welding device, and mounting the connecting piece that have been processed by the pre-assembling step in a movable clamp;

a welding step: driving, by the rotary clamp, the copper terminal to rotate with a rotating speed of 1000 R/Min; driving, by the movable clamp, the connecting piece to move horizontally and extrude the rotating copper terminal with a pressure of 10,000 N, so as to form a molten layer at a front end of the connecting piece through the heat generated by friction, then the molten layer dads the welding platform 11 at a welding end of the copper terminal 1 under the pressure, and forms, together with the welding platform 11, a transition layer 12 with metal atoms penetrating into or combined with each other.

The objective of the embodiment is to demonstrate influences of different proportions of the copper-aluminum solid solution in the transition layer on the pullout force and the voltage drop of the copper-aluminum composite electric energy transmission system. The inventor investigates the pullout forces, the voltage drops and the welding strengths of the copper-aluminum composite electric energy transmission system at different proportions of the copper-aluminum solid solution in the transition layer, and the results are shown in Table 5.

TABLE 5

Influences of the proportion of the copper-aluminum solid solution in the transition layer on the pullout force and the voltage drop of the copper-aluminum composite electric energy transmission system

| | Proportion of the copper-aluminum solid solution in the transition layer (wt %) | | | | | | | | | | | | | |
|---|---|---|---|---|---|---|---|---|---|---|---|---|---|---|
| No. | 5 | 10 | 15 | 20 | 25 | 30 | 40 | 50 | 60 | 70 | 80 | 85 | 90 | 95 |
| | Pullout force of the copper-aluminum composite electric energy transmission system (N) | | | | | | | | | | | | | |
| 1 | 1525 | 2083 | 2259 | 2587 | 2885 | 3073 | 3216 | 3568 | 3733 | 3926 | 4163 | 4426 | 4568 | 4616 |
| | Voltage drop of the copper-aluminum composite electric energy transmission system (mV) | | | | | | | | | | | | | |
| 2 | 0.67 | 0.49 | 0.45 | 0.41 | 0.39 | 0.35 | 0.32 | 0.28 | 026 | 0.23 | 0.19 | 0.17 | 0.15 | 0.14 |

As can be seen from the above table, when the proportion of the copper-aluminum solid solution in the transition layer is less than 10 wt %, the pullout force of the copper-aluminum composite electric energy transmission system gradually decreases, and the voltage drop thereof gradually increases, so the requirements of the mechanical and electrical properties of the copper-aluminum composite electric energy transmission system cannot be satisfied. As the proportion of the copper-aluminum solid solution in the transition layer gradually increases, the mechanical and electrical properties of the copper-aluminum composite electric energy transmission system are gradually improved, so the transition layer contains not less than 10 wt % of the copper-aluminum solid solution.

The Seventh Embodiment

As illustrated in FIG. 5, a copper-aluminum composite electric energy transmission system includes a copper terminal land an aluminum cable 6. The aluminum cable 6 includes an aluminum conductor 2, an insulation layer 3 cladding a periphery of the aluminum conductor 2, a shielding layer 8 cladding a periphery of the insulation layer 3 to shield an electromagnetic interference. and an outer insulation layer 31 cladding a periphery of the shielding layer 8. The system further includes an electric energy transmission aluminum piece 4. A section of the aluminum conductor 2 with the insulation layer 3 stripped from the aluminum cable 6 is wrapped by the electric energy transmission aluminum piece 4 to form a connecting piece. An end of the copper terminal 1 for being welded to the connecting piece is provided with a welding platform 11. A transition layer 12 with metal atoms penetrating into or combined with each other is formed between the welding platform 11 and the connecting piece.

The copper-aluminum composite electric energy transmission system is manufactured by the following process:
  a pre-assembling step: inserting a section of an aluminum conductor 2 with an insulation layer 3 stripped from an aluminum cable into the electric energy transmission aluminum piece 4, and pressing the aluminum conductor 2 with the insulation layer 3 stripped from the aluminum cable into the electric energy transmission aluminum piece 4 using a pressing device to form a connecting piece;
  a clamping step: clamping a copper terminal 1 with a welding platform into a rotary clamp of a friction welding device, and mounting the connecting piece that have been processed by the pre-assembling step in a movable clamp;
  a welding step: driving, by the rotary clamp, the copper terminal to rotate with a rotating speed of 1000 R/Min; driving, by the movable clamp, the connecting piece to move horizontally and extrude the rotating copper terminal with a pressure of 10,000 N, so as to form a molten layer at a front end of the connecting piece through the heat generated by friction, then the molten layer dads the welding platform 11 at a welding end of the copper terminal 1 under the pressure, and forms, together with the welding platform 11, a transition layer 12 with metal atoms penetrating into or combined with each other.

As a further solution, the surface of the copper terminal of the present disclosure is provided with a metal plating layer. Since the copper terminal needs to be connected to an electricity consuming device, it will be exposed to air and water, and even salt in the air in some places. As a result, the copper terminal may be subjected to an oxidization and a salt-spray corrosion, which will reduce the service life thereof. In severe cases, the copper terminal may be short-circuited and cause a burning accident, resulting in a greater loss. Therefore, the metal plating layer provided on the surface of the copper terminal can effectively prevent the erosion of air, water and salt spray, prolong the service life of the copper terminal and even the copper-aluminum joint, and reduce the safety accidents. A metal material with a potential between those of copper and aluminum may be selected as the metal material of the plating layer, so as to reduce the electrochemical corrosion in the transition layer caused by the large potential between copper and aluminum, thus prolonging the service life of the copper-aluminum composite electric energy transmission system. Therefore, optionally, in the present disclosure, the material of the metal plating layer contains, but is not limited to, one selected from the group of nickel, cadmium, zirconium, chromium, cobalt, manganese, aluminum, tin, titanium, zinc, copper, silver, and gold.

The objective of the embodiment is to demonstrate influences of the copper terminals provided with different metal plating layers on the pullout force and the voltage drop of the copper-aluminum composite electric energy transmission system. The inventor investigates the pullout forces, the voltage drops and the welding strengths of the copper-aluminum composite electric energy transmission systems made of the copper terminals provided with different metal cladding layers after 48 hours of salt spray experiment, and the results are shown in Table 6.

TABLE 6

Influences of different materials of the metal cladding layer on the properties of the copper-aluminum composite electric energy transmission system

| Cross-sectional area of the wire | Material of the metal plating layer | | | | | | | | | | | | | |
| --- | --- | --- | --- | --- | --- | --- | --- | --- | --- | --- | --- | --- | --- | --- |
| mm² | No | Ni | Cd | Zr | Cr | Co | Mn | Al | Sn | Ti | Zn | Cu | Ag | Au |
| Pullout force of the copper-aluminum composite electric energy transmission system after 48 h salt spray experiment (N) | | | | | | | | | | | | | | |
| 35 | 1936 | 3756 | 3762 | 3698 | 3526 | 3463 | 3777 | 3454 | 3367 | 3845 | 3589 | 3752 | 3869 | 3956 |

TABLE 6-continued

Influences of different materials of the metal cladding layer on the properties of the copper-aluminum composite electric energy transmission system

| Cross-sectional area of the wire | Material of the metal plating layer | | | | | | | | | | | | | |
|---|---|---|---|---|---|---|---|---|---|---|---|---|---|---|
| mm² | No | Ni | Cd | Zr | Cr | Co | Mn | Al | Sn | Ti | Zn | Cu | Ag | Au |
| | Voltage drop of the copper-aluminum composite electric energy transmission system after 48 h salt spray experiment (mV) | | | | | | | | | | | | | |
| 35 | 0.83 | 0.37 | 0.35 | 0.36 | 0.38 | 0.36 | 0.33 | 0.34 | 0.36 | 0.28 | 0.38 | 0.36 | 0.26 | 0.23 |

As can be seen from the above table, after 48 hours of salt spray experiment on the copper-aluminum composite electric energy transmission system without an anti-corrosion protection layer, the pullout force of the electrical connector obviously decreases and the voltage drop obviously increases, which cannot well satisfy the requirements that the pullout force of the copper-aluminum composite electric energy transmission system should be greater than 2,000 N and the voltage drop should be below 0.5 mV. For any other copper-aluminum composite electric energy transmission system with an anti-corrosion protection layer, the pullout force and the voltage drop thereof still satisfy the requirements of the mechanical and electrical properties of the copper-aluminum composite electric energy transmission system after the experiment. Therefore, the inventor sets the material of the anti-corrosion protection layer to contain at least one selected from the group of nickel, cadmium, zirconium, chromium, cobalt, manganese, aluminum, tin, titanium, zinc, copper, silver, and gold.

The Eighth Embodiment

The copper-aluminum welding terminal is manufactured according to the steps of the First Embodiment. In this embodiment, in order to demonstrate the influence of the thickness of the transition layer on the pullout force, the voltage drop and the welding strength of the copper-aluminum composite electric energy transmission system, the inventor investigates the pullout forces, the voltage drops and the welding strengths of the copper-aluminum composite electric energy transmission system at different thicknesses of the transition layer, and the results are shown in Table 7.

TABLE 7

Influences of different thicknesses of the copper-aluminum transition layer on the pullout force and the voltage drop of the copper-aluminum composite electric energy transmission system

| | Different thicknesses of the copper-aluminum transition layer (μm) | | | | | | | | |
|---|---|---|---|---|---|---|---|---|---|
| No. | 0.001 | 0.005 | 0.01 | 0.05 | 0.1 | 0.5 | 1 | 5 | 10 |
| | Pullout force of the copper-aluminum composite electric energy transmission system (N) | | | | | | | | |
| 1 | 1123 | 1345 | 2164 | 3071 | 4129 | 4264 | 4384 | 4458 | 4575 |
| | Voltage drop of the copper-aluminum composite electric energy transmission system (mV) | | | | | | | | |
| 2 | 0.71 | 0.65 | 0.48 | 0.38 | 0.28 | 0.28 | 0.27 | 0.26 | 0.25 |
| | Pullout force of the copper-aluminum composite electric energy transmission system after the salt spray experiment (N) | | | | | | | | |
| 3 | 687 | 964 | 2038 | 2884 | 4087 | 4164 | 4219 | 4230 | 4343 |
| | Voltage drop of the copper-aluminum composite electric energy transmission system after the salt spray experiment (mV) | | | | | | | | |
| 4 | 0.82 | 0.73 | 0.49 | 0.39 | 0.29 | 0.29 | 0.28 | 0.27 | 0.26 |
| | Different thicknesses of the copper-aluminum transition layer (μm) | | | | | | | | |
| No. | 50 | 100 | 300 | 500 | 800 | 1000 | 1300 | 1500 | 1800 |
| | Pullout force of the copper-aluminum composite electric energy transmission system (N) | | | | | | | | |
| 1 | 4622 | 4787 | 4823 | 4965 | 5113 | 5255 | 4937 | 4881 | 4529 |
| | Voltage drop of the copper-aluminum composite electric energy transmission system (mV) | | | | | | | | |
| 2 | 0.25 | 0.24 | 0.23 | 0.22 | 0.18 | 0.17 | 0.20 | 0.21 | 0.22 |
| | Pullout force of the copper-aluminum composite electric energy transmission system after the salt spray experiment (N) | | | | | | | | |
| 3 | 4367 | 4474 | 4557 | 4672 | 5027 | 5145 | 4852 | 4647 | 4324 |
| | Voltage drop of the copper-aluminum composite electric energy transmission system after the salt spray experiment (mV) | | | | | | | | |
| 4 | 0.26 | 0.25 | 0.25 | 0.24 | 0.19 | 0.18 | 0.24 | 0.25 | 0.27 |

TABLE 7-continued

Influences of different thicknesses of the copper-aluminum transition layer on the pullout force and the voltage drop of the copper-aluminum composite electric energy transmission system

| | Different thicknesses of the copper-aluminum transition layer (μm) | | | | | | | | |
|---|---|---|---|---|---|---|---|---|---|
| No. | 2000 | 2300 | 2500 | 2800 | 3000 | 3500 | 4000 | 4500 | 5000 |
| | Pullout force of the copper-aluminum composite electric energy transmission system (N) | | | | | | | | |
| 1 | 4365 | 4293 | 4137 | 3635 | 3464 | 3283 | 2914 | 2866 | 2687 |
| | Voltage drop of the copper-aluminum composite electric energy transmission system (mV) | | | | | | | | |
| 2 | 0.26 | 0.28 | 0.29 | 0.35 | 0.38 | 0.40 | 0.42 | 0.44 | 0.45 |
| | Pullout force of the copper-aluminum composite electric energy transmission system after the salt spray experiment (N) | | | | | | | | |
| 3 | 4243 | 4157 | 4071 | 3536 | 3123 | 3078 | 2775 | 2697 | 2429 |
| | Voltage drop of the copper-aluminum composite electric energy transmission system after the salt spray experiment (mV) | | | | | | | | |
| 4 | 0.27 | 0.28 | 0.29 | 0.37 | 0.40 | 0.42 | 0.46 | 0.46 | 0.47 |
| | Different thicknesses of the copper-aluminum transition layer (μm) | | | | | | | | |
| No. | 5300 | 5500 | 5800 | 6000 | 6300 | 6500 | 6800 | 7000 | 7500 |
| | Pullout force of the copper-aluminum composite electric energy transmission system (N) | | | | | | | | |
| 1 | 2422 | 2335 | 2283 | 2181 | 1618 | 1586 | 1345 | 1294 | 1152 |
| | Voltage drop of the copper-aluminum composite electric energy transmission system (mV) | | | | | | | | |
| 2 | 0.45 | 0.46 | 0.46 | 0.47 | 0.58 | 0.65 | 0.67 | 0.75 | 0.89 |
| | Pullout force of the copper-aluminum composite electric energy transmission system after the salt spray experiment (N) | | | | | | | | |
| 3 | 2210 | 2183 | 2127 | 2053 | 1557 | 1424 | 1078 | 932 | 548 |
| | Voltage drop of the copper-aluminum composite electric energy transmission system after the salt spray experiment (mV) | | | | | | | | |
| 4 | 0.48 | 0.48 | 0.49 | 0.49 | 0.63 | 0.68 | 0.71 | 0.85 | 0.93 |

The results in Table 7 show that when the thickness of the copper-aluminum transition layer is less than 0.01 μm, the pullout force of the copper-aluminum composite electric energy transmission system obviously decreases, and the voltage drop thereof obviously increases. The mechanical and electrical properties of the corresponding copper-aluminum composite electric energy transmission system are poor. Moreover, after the salt spray experiment on the copper-aluminum composite electric energy transmission system, the mechanical and electrical properties are more degraded, which greatly decreases the performance and the service life of the copper-aluminum composite electric energy transmission system.

When the thickness of the copper-aluminum transition layer is more than 6,000 μm, the mechanical and electrical properties of the copper-aluminum composite electric energy transmission system are in a decline trend. Correspondingly, in order to obtain a copper-aluminum transition layer with a thickness more than 6,000 μm, the pressure applied by the device and the duration are greatly increased. Therefore, the inventor selects the thickness of the copper-aluminum transition layer to be 0.01 μm to 6,000 μm.

The Ninth Embodiment

The processing method of the copper-aluminum composite electric energy transmission system according to the above embodiments further includes a welding platform manufacturing step of processing an end surface of the copper terminal using a mechanical processing device to obtain the welding platform.

Further, the mechanical processing device may be a turning device. Before welding, a turning tool of the turning device is adopted for turning of the end surface of the rotating copper terminal to obtain the welding platform.

Further, the mechanical processing device may be a milling device. Before welding, a milling cutter of the milling device is adopted for milling the end surface of the fixed copper terminal to obtain the welding platform.

Further, the mechanical processing device may be a sawing device. Before welding, a saw web of the sawing device is adopted for sawing the end surface of the fixed copper terminal to obtain the welding platform.

Further, the mechanical processing device may be a grinding device. Before welding, a grinding wheel of the grinding device is adopted for grinding the end surface of the fixed copper terminal to obtain the welding platform.

Further, the mechanical processing device may be a planing device. Before welding, a planer tool of the planing device is adopted for planing the end surface of the fixed copper terminal to obtain the welding platform.

The mechanical processing device of the present disclosure includes, but is not limited to, the above processing devices and processing modes.

Those described are only exemplary embodiments of the present disclosure, and cannot limit the protection scope of the present disclosure. Any insubstantial change or substitution made by those skilled in the art on the basis of the present disclosure should fall within the protection scope of the present disclosure.

The invention claimed is:

1. A copper-aluminum composite electric energy transmission system, comprising:
   a copper terminal and an aluminum cable, with the aluminum cable comprising an aluminum conductor and an insulation layer cladding a periphery of the aluminum conductor, wherein the system further comprises an electric energy transmission aluminum piece, and a section of the aluminum conductor with the insulation layer stripped from the aluminum cable is wrapped by the electric energy transmission aluminum piece to form a connecting piece; an end of the copper terminal for being welded to the connecting piece is provided with a welding platform, and the welding platform protrudes from the end of the copper terminal toward the connecting piece;

the welding platform comprises:
an end face welded to the connecting piece;
a root portion connected to the end of the copper terminal and has a cross-sectional area lager than that of the end face; and
a side surface extending obliquely from a peripheral edge of the end face to a peripheral edge of the root portion; and
a transition layer with metal atoms penetrating into or combined with each other is formed between the end face as well as the side surface of the welding platform and the connecting piece.

2. The copper-aluminum composite electric energy transmission system according to claim 1, wherein a front end of the connecting piece is provided with a molten layer, and the molten layer forms an extension cladding layer extending in an axis direction of the copper terminal around the end face of the welding platform towards the end of the copper terminal, and the extension cladding layer clads the welding platform and an outer side of the transition layer.

3. The copper-aluminum composite electric energy transmission system according to claim 2, wherein the extension cladding layer at least clads to the end of the copper terminal.

4. The copper-aluminum composite electric energy transmission system according to claim 2, wherein the molten layer has a thickness of 0.01 cm to 15 cm.

5. The copper-aluminum composite electric energy transmission system according to claim 2, wherein the copper terminal and the aluminum cable are coaxially disposed; and
an outer side surface of the extension cladding layer is aligned with an outer side surface of the electric energy transmission aluminum piece and an outer side surface of the copper terminal.

6. The copper-aluminum composite electric energy transmission system according to claim 1, wherein the cross-sectional area of the end face of the welding platform is at least 50% of that of the root portion.

7. The copper-aluminum composite electric energy transmission system according to claim 1, wherein the welding platform has a height of 0.01 cm to 15 cm.

8. The copper-aluminum composite electric energy transmission system according to claim 1, wherein the transition layer contains a copper-aluminum solid solution not less than 10 wt %.

9. The copper-aluminum composite electric energy transmission system according to claim 1, wherein the transition layer has a thickness of 0.01 μm to 6,000 μm.

10. The copper-aluminum composite electric energy transmission system according to claim 1, wherein a surface of the copper terminal is provided with a metal plating layer.

11. The copper-aluminum composite electric energy transmission system according to claim 10, wherein the material of the metal plating layer contains at least one selected from the group of nickel, cadmium, zirconium, chromium, cobalt, manganese, aluminum, tin, titanium, zinc, copper, silver, and gold.

12. The copper-aluminum composite electric energy transmission system according to claim 1, wherein the aluminum cable further comprises a shielding layer cladding a periphery of the insulation layer to shield an electromagnetic interference.

13. The copper-aluminum composite electric energy transmission system according to claim 1, wherein the cross-sectional area of the root portion is smaller than that of the end of the copper terminal; and
the transition layer is formed between the connecting piece and the end face as well as the side surface of the welding platform, and between the connecting piece and an end face of the end of the copper terminal that is outside of the root portion.

14. A processing method of a copper-aluminum composite electric energy transmission system, comprising:
a pre-assembling step: inserting a section of an aluminum conductor with an insulation layer stripped from an aluminum cable into an electric energy transmission aluminum piece, and pressing the section of the aluminum conductor into the electric energy transmission aluminum piece using a pressing device to form a connecting piece wrapped by the electric energy transmission aluminum piece;
a welding platform manufacturing step: processing an end surface of the copper terminal using to obtain the welding platform, wherein the welding platform protrudes from the end of the copper terminal toward the connecting piece, and the welding platform comprises an end face welded to the connecting piece, a root portion connected to the end of the copper terminal and has a cross-sectional area lager than that of the end face, and a side surface extending obliquely from a peripheral edge of the end face to a peripheral edge of the root portion; and
a welding step: welding the copper terminal with the welding platform to the connecting piece, to form a transition layer with metal atoms penetrating into or combined with each other between the end face as well as the side surface of the welding platform and the connecting piece.

15. The processing method of the copper-aluminum composite electric energy transmission system according to claim 14, wherein the welding step further comprises:
forming a molten layer at a front end of the connecting piece, wherein the molten layer forms an extension cladding layer extending in an axis direction of the copper terminal around the end face of the welding platform toward the copper terminal, and the extension cladding layer clads the welding platform and an outer side of the transition layer.

16. The processing method of the copper-aluminum composite electric energy transmission system according to claim 15, wherein
the welding platform manufacturing step comprises: processing the end surface of the copper terminal using a mechanical processing device to obtain the welding platform.

17. The processing method of the copper-aluminum composite electric energy transmission system according to claim 15, wherein the copper terminal and the aluminum cable are coaxially disposed; and
an outer side surface of the extension cladding layer is aligned with an outer side surface of the electric energy transmission aluminum piece and an outer side surface of the copper terminal.

18. The processing method of the copper-aluminum composite electric energy transmission system according to claim 14, wherein
 the welding platform manufacturing step comprises: processing the end surface of the copper terminal using a mechanical processing device to obtain the welding platform.

19. The processing method of the copper-aluminum composite electric energy transmission system according to claim 14, wherein the cross-sectional area of the root portion is smaller than that of the end of the copper terminal; and
 the transition layer is formed between the connecting piece and the end face as well as the side surface of the welding platform, and between the connecting piece and an end face of the end of the copper terminal that is outside of the root portion.

\* \* \* \* \*